United States Patent Office 3,574,537
Patented Apr. 13, 1971

3,574,537
PROCESS FOR THE SEPARATION OF USEFUL COMPOUNDS FROM WASTE OF THE ALUMINUM INDUSTRY
Jui-Hsiung Tsai, 10, Lane 101 Liao Ning St., Taipei, China
No Drawing. Filed Dec. 18, 1967, Ser. No. 691,166
Int. Cl. C01b 33/00, 33/16, 33/32
U.S. Cl. 23—110                                     1 Claim

ABSTRACT OF THE DISCLOSURE

Process for the treatment of red-mud to extract $Fe_2O_3$, $Al_2O_3$, $SiO_2$ and $Na_2O$, in which $SO_2$ is passed into a solution of red-mud and the $Fe_2O_3$ separated therefrom. The liquor is heated until a pH of 4.5 to 5.0 is reached forming a precipitate of $SiO_2$ and $Al(OH)SO_3$. The precipitate is separated from the liquor which is concentrated to crystallize out $Na_2SO_3$. Sulphuric acid is added to the separated precipitate forming water-soluble aluminum salts. $SiO_2$ remains as a residue and is removed from solution. Water and a potassium or ammonium salt is added to the liquor from which the corresponding alum may be crystallized out. The precipitate of $SiO_2$ may be further treated to obtain silica gel or water glass.

BACKGROUND OF THE INVENTION

This invention concerns a process for the separation of useful compounds from waste red-mud of the aluminium industry.

In the production of aluminium oxide from Bauxite by the Bayer process, so-called red-mud occurs which hitherto has been regarded as waste, and which has produced disposal problems. This invention provides a process for separating one or more of the main components of red-mud which are $Fe_2O_3$, $Al_2O_3$, $SiO_2$ and $Na_2O$ such that chemicals of industrial purity may be obtained. Such chemicals are red iron oxide, alum, silica gel useful as a desiccant, water glass and sodium sulphite.

The object of the invention is to provide a process for the separation of one or more industrial useful components from red-mud. A further object is to provide for the separation of substantially all of the main components of red-mud, thereby eliminating the problem of waste disposal. This invention more specifically provides for the preparation and separation of one or more or all of the following: $Fe_2O_3$, $Na_2SO_3$, potassium or ammonium alums and silica gel or water glass.

SUMMARY OF THE INVENTION

According to one feature of this invention, there is provided a process for the preparation of $Fe_2O_3$ from red-mud waste, which process consists in mixing red-mud with water, filtering the solution and passing $SO_2$ into the filtrate until the $SO_2$ content is 13%–18% by wt., clarifying the mixture and passing the clear liquor into a vacuum evaporator, washing the sediment with sulphurous acid solution, which solution after washing is passed into the vacuum evaporator, and in removing said sediment containing $Fe_2O_3$.

The red-mud may be mixed with water in a ratio of 1:2.5 by weight. The solution thus obtained is preferably filtered on a 60-mesh sieve. It is of advantage to carry out the clarification in an air-tight clarifier, and to wash the sediment with saturated sulphurous acid solution two or three times.

When the $SO_2$ is passed into the filtrate the equilibrium $$SO_2 + H_2O \rightleftharpoons H_2SO_3 \rightleftharpoons H^+ + HSO_3^- \rightleftharpoons 2H^+ + SO_3^{2-}$$

is set up. When absorption of $SO_2$ starts the pH of the solution will be between 4.5 and 5.0. At this time $Al(OH)SO_3$ is not dissolved.

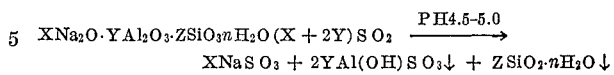

When about 15% of $SO_2$ has been absorbed, components of the red-mud such as $Al_2O_3$, $SiO_2$, $NaO_2$ are dissolved as follows:

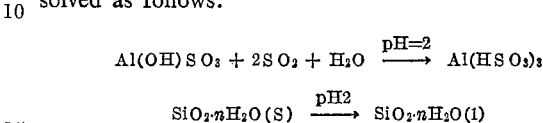

while $Fe_2O_3$ remains as a precipitate. The mixture is then clarified and the filter residue can be washed with sulphurous acid solution.

The filter residue, containing mainly $Fe_2O_3$ and a small amount of $TiO_2$, together with un-reacted monohydrated aluminium compounds, is then graded. The coarser parts may be used in cement, and the finer parts used in paints and as pigments.

According to a second feature of this invention, a process is provided which consists in heating the liquor occurring in the vacuum evaporator until a pH of 4.5 to 5.0 is reached, recovering the $SO_2$ liberated, filtering the resulting solution, evaporating the resultant liquor to saturation point, cooling the liquor, and removing $Na_2SO_3$ which is crystallised out.

Preferably the filtration is carried out in a vacuum filter, and the evaporation in a vacuum evaporator.

In this second process the main constituents of the liquor in the vacuum evaporator from the first process are aluminium bisulphite, aluminium sulphite, and sodium bisulphite. These parts are decomposed by heat to form $Al(OH)SO_3$ and $Na_2SO_3$. The $SO_2$ liberated may be recycled back to the first process. Thus,

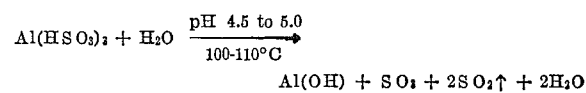

In this process the soluble silicic acid is converted to insoluble silica gel, and aluminium bisulphite and sulphite are converted to insoluble $Al(OH)SO_3$. These form the precipitates which are used in the next process. The liquor containing sodium sulphite and a small amount of impurities is evaporated until saturation occurs, on cooling to room temperature, with agitation $Na_2SO_3$ crystallises out.

According to a third feature of this invention, a process is provided which consists of adding sufficient sulfuric acid to the precipitate produced from the second process to convert all the $Al_2O_3$ present to water-soluble aluminum salts, recovering the $SO_2$ liberated, removing the precipitate of $SiO_2$ remaining, adding potassium sulfate or ammonium sulfate to the liquor, concentrating the solution, and cooling and seeding the solution with alum to crystallize out potassium or ammonium alum.

Preferably the $SiO_2$ precipitate is washed several times with hot water, the water then being added to the liquor.

In this third process sulphuric acid (specific gravity 1.84) is added to convert all the $Al_2O_3$ present by calculation. Aluminium sulphite is converted to aluminium sulphate which dissolves in the solution. The $SO_2$ recovered may be recycled. Thus

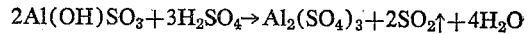

The $SiO_2$ which forms the precipitate may be removed by a vacuum filter. Potassium sulphate or ammonium sulphate is added in sufficient amount to react with the $Al_2O_3$ present to form potassium or ammonium alum $$Al_2(SO_4)_3 K_2SO_4 \cdot 24H_2O$$

or $$Al_2(SO_4)_3(NH_4)_2SO_4 \cdot 24H_2O$$

This solution may be heated to form a concentrated saturated solution which is then cooled slowly to room temperature and seeded with alum.

According to a fourth feature of this invention, a process is provided which consists in washing the precipitate of $SiO_2$ produced in the preceding process several times with hot water until the washes are neutral, and in drying the residue at 280° C. to obtain silica gel. Alternatively, to the precipitate is added alkali. This solution is then heated and concentrated to obtain water glass.

By this process silica gel is produced which is useful as desiccant; thus $$Si(OH)_4 \xrightarrow{H_2O} SiO_2 \cdot nH_2O$$

It may thus be seen the processes of the invention provide an efficient and economical means by which the so-called waste red-mud may be processed. Further, about 50% of $SO_2$ used may be recycled and used again.

Since no substantial quantities of waste remain at the end of the processes, the problem of waste disposal is overcome. In addition, certain industrially useful components are produced.

The several features of the invention will be further illustrated by the following examples.

EXAMPLES

Example 1.—Separation of $Fe_2O_3$ from red mud

To 10 metric tons (MT) of red-mud in a tank, were added 25 MT of water. The mixture was stirred thoroughly to ensure no coagulated lumps of mud were present. The mixture was filtered through a 60-mesh sieve into a reaction tank and $SO_2$ passed into the tank until the $SO_2$ content in the solution was 13%–18% by wt. At this point $Al_2O_3$, $SiO_2$ and $Na_2O$ were converted to sulphite which passed into solution. $Fe_2O_3$ remained undissolved. This reaction mixture was poured into an airtight clarifier. The clean liquor was transferred to a vacuum evaporator, and the mud-like sediment filtered using a vacuum filter. The sediment was then washed three times with a saturated sulphurous acid solution. The washing liquid was mixed with the clear liquor obtained from the clarifier.

The resulting filter sediment weighed 3 MT and comprised between 40 and 60% $Fe_2O_3$. After calcination at between 900 and 1000° C. a red iron oxide was obtained with an $Fe_2O_3$ content of 55 to 80%.

Example 2.—Separation of $Na_2SO_3$

The clear liquor in the vacuum evaporator of Example I was heated to form a solution with a pH of 4.5 to 5.0 (about 100–110° C.). This caused decomposition of aluminium bisulphite and aluminium sulphite to insoluble $Al(OH).SO_3$ was precipitated. The soluble silicic acid was converted to insoluble silica gel, and sodium bisulphite to sodium sulphite. The mixture was treated in a vacuum filter, and the liquor transferred to a vacuum evaporator, the solid precipitates being retained for further treatment. The liquor was evaporated to over saturation point, and then cooled down to room temperature accompanied by agitation. Mixed crystals of $Na_2SO_3$ and $Na_2SO_4$ were precipitated. These components are useful as bleaching agents.

Example 3.—Separation of alums

The solid precipitates obtained in Example 2 were transferred to a reaction tank, and sufficient sulphuric acid was added to convert all the aluminium salts to $Al_2(SO_4)_3$. The $SO_2$ evolved was recovered and used again. $SiO_2$ is not dissolved in this process, and is filtered from the solution using a vacuum filter. The $SiO_2$ filtrate was washed with hot water several times, and the washing water added to the solution separated in the vacuum filter.

Potassium or ammonium alum was added to the separated solution in a quantity sufficient to ensure the conversion of the salts to alums. The solution was then concentrated by heating, cooled slowly to room temperature, and seeded with alum crystals. 5 to 7 MT of potassium or ammonium alum were produced. The purity of the alum was between 90 and 98%.

Example 4.—Production of silica gel or water glass

The insoluble $SiO_2$ filtrate produced in Example 3 was washed with hot water until the washing water showed no sign of acidity. The solids were dried at 280° C., and 0.7 to 1.0 MT of silica gel, useful as a desiccant, was obtained ($SiO_2$ content 90 to 98%).

Alternatively to the filtrate was added a sufficient quantity of an alkali, and this solution heated and concentrated to an appropriate consistency. 1 MT of colourless to yellow water glass was obtained.

The various examples and techniques hereinbefore given are only illustrations of the invention, and are not intended to restrict the scope.

I claim:
1. A process for the separation of useful compounds from red-mud waste produced by the production of aluminum oxide from Bauxite by the Bayer process said process comprising the steps of (a) mixing red-mud with water; (b) filtering the mixture and passing $SO_2$ into the filtrate until the $SO_2$ content is 13%–18% by weight; (c) clarifying the $SO_2$-treated filtrate to produce clear liquor and a sediment; (d) evaporating said clear liquor until a pH of about 4.5 to 5.0 is reached; (e) filtering the resultant solution to produce a filtrate and a precipitate; (f) adding sufficient sulphuric acid to the precipitate to convert all the aluminum salts present to $Al_2(SO_4)_3$; (g) removing the remaining precipitate of $SiO_2$; and (h) adding an alkali solution to the $SiO_2$ and heating and concentrating the solution to obtain water-glass.

References Cited

UNITED STATES PATENTS

| | | | |
|---|---|---|---|
| 1,293,008 | 2/1919 | Blardone | 23—110 |
| 1,493,708 | 5/1924 | Schneider | 23—110 |
| 1,661,618 | 3/1928 | Muth | 23—123 |
| 1,916,603 | 7/1933 | Buchner et al. | 23—123 |
| 2,224,888 | 12/1940 | Walthall | 23—123 |
| 3,311,449 | 3/1967 | Atsukawa et al. | 23—130 |

EDWARD STERN, Primary Examiner

U.S. Cl. X.R.

23—118, 119, 123, 129, 130, 182, 200

PO-1050
(5/69)

UNITED STATES PATENT OFFICE
CERTIFICATE OF CORRECTION

Patent No. 3,574,537      Dated April 13, 1971

Inventor(s) Jui-Hsiung Tsai

It is certified that error appears in the above-identified patent and that said Letters Patent are hereby corrected as shown below:

Column 2, line 5, that portion of the equation reading "$ZSiO_3nH_2O$" should read -- $ZSiO_3 \cdot nH_2O$ --; and "PH" should read -- pH --.

Column 2, line 6, that portion of the equation reading "$XNaSO_3$" should read -- $XNa_2SO_3$ --.

Signed and sealed this 17th day of August 1971.

(SEAL)
Attest:

EDWARD M. FLETCHER, JR.       WILLIAM E. SCHUYLER, JR
Attesting Officer      Commissioner of Patents